United States Patent

Ohlschlager et al.

[15] 3,650,756

[45] Mar. 21, 1972

[54] SENSITIZATION OF LAYERS MADE OF POLYMERS WHICH CAN BE CROSS-LINKED BY THE ACTION OF LIGHT

[72] Inventors: Hans Ohlschlager, Cologne-Stammheim; Oskar Riester; Eckart Seelig, both of Leverkusen, all of Germany

[73] Assignee: AGFA-Gevaert Aktiengesellschaft, Leverkusen, Germany

[22] Filed: July 14, 1969

[21] Appl. No.: 841,553

[30] Foreign Application Priority Data

July 15, 1968 Germany ......................P 17 72 867.5

[52] U.S. Cl. ....................................................96/91, 96/115

[51] Int. Cl. ..........................................................G03c 1/52

[58] Field of Search ..........................................96/115, 35.1

[56] References Cited

UNITED STATES PATENTS

| | | | |
|---|---|---|---|
| 3,528,813 | 9/1970 | Ohlschlager | 96/35.1 |
| 3,099,558 | 7/1963 | Levinos | 96/35.1 UX |
| 3,038,800 | 6/1962 | Lucky et al. | 96/35.1 |
| 2,773,822 | 12/1956 | Kern | 96/115 P |

*Primary Examiner*—Norman G. Torchin
*Assistant Examiner*—John L. Goodrow
*Attorney*—Connolly and Hutz

[57] ABSTRACT

Recording materials comprising at least one layer of a polymer which can be cross-linked by the action of light. The recording material can be very effectively spectroscopically sensitized, particularly in the visible region of the spectrum. The sensitizers include condensation products of a methyl mercapto quaternary salt or of an acetanilidovinyl quaternary salt of a heterocyclic base with a cyanothioacetamide compound in solvent with a base.

1 Claims, No Drawings

SENSITIZATION OF LAYERS MADE OF POLYMERS WHICH CAN BE CROSS-LINKED BY THE ACTION OF LIGHT

The invention relates to the sensitization of layers made of polymers which can be cross-linked by the action of light, which polymers undergo cross-linking on exposure.

Certain light-sensitive polymers when exposed in the form of a thin layer on a suitable support undergo an imagewise change so that the unexposed parts of the layer can be dissolved away by subsequent development with a solvent while the exposed parts of the layer, where the image has been, remain insoluble. It is known that these can be used to produce acid resists and in lithographic and similar reproduction processes. These light-sensitive synthetic resins contain as their light-sensitive groups, for example, cinnamic acid, cinnamylidene acetic acid or azide groups.

It is also known that the light-sensitivity of these synthetic resins can be greatly increased by means of sensitizers such as triphenylmethane dyes, aromatic ketones or nitro compounds.

It is the object of the invention to find new sensitizers and to increase as much as possible the light-sensitivity of polymer layers which can be cross-linked by the action of light.

A recording material has now been found which contains a layer which consists of a polymer which can be cross-linked by light and which contains a compound of the following formula to increase the sensitivity, particularly in the visible region of the spectrum:

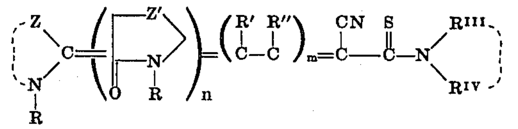

in which

Z'is an O, S or Se atom, or a >N—R group

Z represents the nonmetallic ring members necessary to complete, in particular, a 5-membered or 6-membered ring, but also may represent the members necessary to complete a larger heterocyclic ring, which ring may contain an attached benzene or naphthalene ring; thus it includes the usual heterocyclic members of cyanine chemistry such as those of the benzothiazole series (e.g., benzothiazole, 4-chloro-benzothiazole, 5-chlorobenzothiazole, 6-chloro-benzothiazole, 7-chlorobenzothiazole, 4-methyl-benzothiazole, 5-methylbenzothiazole, 6-methyl-benzothiazole, 5,6-dimethylbenzothiazole, 6-bromo-benzothiazole, 4-phenylbenzothiazole, 5-phenylbenzothiazole, 4-methoxybenzothiazole, 5-methoxy-benzothiazole, 6-methoxybenzothiazole, 5-iodo-benzothiazole, 6-iodobenzthiazole, 6-ethoxy-benzothiazole, 5-ethoxybenzothiazole, tetrahydrobenzothiazole, methylene-5,6-dihydroxybenzothiazole, 5-hydroxybenzothiazole, 6-hydroxybenzothiazole, 5- or 6-diethylaminobenzothiazole, 5-carboxylic acid benzothiazole, 5-sulfonic acid benzothiazole etc.), those of the naphthothiazole series (e.g., α-naphthothiazole, β-naphthothiazole, 5-methoxy-β-naphthothiazole, 5-ethoxy-β-naphthothiazole, 7-methoxy-β-naphthothiazole, β-methoxy-α-naphthothiazole, indenobenzothiazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5,6-dimethylbenzoselenazole, 5-hydroxybenzoselenazole, tetrahydrobenzoselenazole, etc.), those of the naphthoselenazole series (e.g., α-napththoselenazole, β-naphthoselenazole, etc.), those of the thiazoline series (e.g., thiazoline, 4-methylthiazoline, etc.), those of the 2-pyrroline or 2-piperidine or 2-homopiperidine series, those of the 2-quinoline series (e.g., quinoline, 3-methylquinoline, 5-methylquinoline, 7-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 3,3-dialkylindolenine series (e.g., 3,3,-dimethylindolenine, 3,3,5-trimethylindolenine, 3,3-dimethyl-5-methoxyindolenine, etc.), those of the 2-pyridine series (e.g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 5-ethyl-pyridine, 4-chloropyridine, 5-chloropyridine, 6-chloropyridine, 3-hydroxypyridine, 4-hydroxypyridine, 5 -hydroxypyridine, 2-phenylpyridine, 4-phenylpyridine, 6-phenylpyridine, etc.), those of the oxazole series (e.g., 4-phenyloxazole, 4,5-diphenyloxazole, 4-methylbenzoxazole), those of the benzoxazole series (e.g., benzoxazole, 5-methylbenzoxazole, 6-methylbenzoaxazole, 5,6-dimethylbenzoxazole, 5-methoxybenzoxazole, 6-dialkylaminobenzoxazole, 5-phenylbenzoxazole, 5-carboxylic acid benzoxazole, 5-acrylic acid benzoxazole, 5-sulfonamido benzoxazole, 5-sulfonic acid benzoxazole, 5-chlorobenzoxazole), those of the naphthoxazole series (e.g., 4,5-benzobenzoxazole, 5,6-benzobenzoxazole, 6,7-benzobenzoxazole, etc.), those of the 4-pyridine series (e.g., 2-methylpyridine, 3-methylpyridine, 2-chloropyridine, 3-chloropyridine, 2,3-dimethylpyridine, 2-hydroxypyridine, 3-hydroxypyridine, etc.), those of the thiodiazole, oxodiazole, imidazole or benzimidazole, 5-chlorobenzimidazole, 5,6-dichlorobenzimidazole, 5-trifluoromethylbenzimidazole or pyrimidine or triazine or benzothiazine series;

R is a saturated or olefinically unsaturated aliphatic radical having preferably up to five carbon atoms which may be substituted, (e.g., with carboxyl, sulfonic acid, sulfamide, carbamoyl or sulfate groups or with phosphoric acid radicals, hydroxyl, amino or cycloalkyl or aryl groups, preferably phenyl, or aralkyl, preferably benzyl or phenylethyl groups;

$R^{I}$ and $R^{II}$ represent hydrogen atoms or alkyl groups preferably having up to three carbon atoms;

$R^{III}$ and $R^{IV}$ represent hydrogen atoms, alkyl or alkylene groups, preferably having up to six carbon atoms, cycloalkyl groups, such as cyclohexyl, aryl groups, preferably a radical of the phenyl or naphthyl series, aralkyl groups, such as benzyl or phenylethyl groups, or heterocyclic groups; $R^{III}$ and $R^{IV}$ together may denote the ring members required to complete a heterocyclic ring, preferably a 5, 6 or 7 membered saturated ring, (e.g., those required to complete a pyrrolidine, piperidine, hexamethyleneimine, piperazine, morpholine, thiomorpholine or isoindolenine ring;

$n$ is 0 or 1; and $m$ is 0 or 1.

The heterocyclic rings or aryl groups contained in the above formula may themselves be substituted in any way, (e.g., with alkyl groups having preferably up to three carbon atoms, such as methyl or ethyl, halogen atoms such as chlorine or bromine, hydroxyl or alkoxy groups, which preferably have up to three carbon atoms, such as methoxy or ethoxy, hydroxyalkyl, thioalkyl or aryl groups, such as phenyl or aralkyl such as benzyl, amino, substituted amino and the like.

The nature of these substituents is of minor importance for the sensitizing effect, but other physical properties, such as solubility, can be influenced in the desired manner by suitable choice of these substituents.

The following structural formulae exemplifies suitable sensitizing compounds according to this invention:

1.
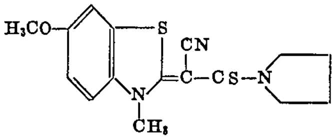
F.P. 145–147°.
2.
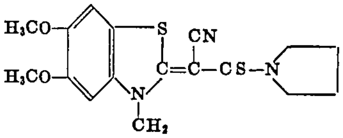
F.P. 216–217°.
3.
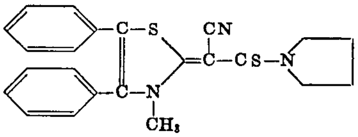
F.P. 213–216°.
4.
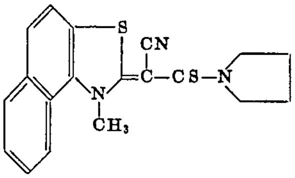
F.P. 218–220°.
5.
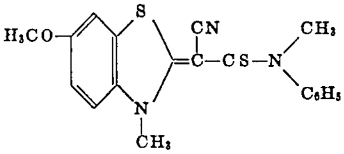
F.P. 192–193°.
6.
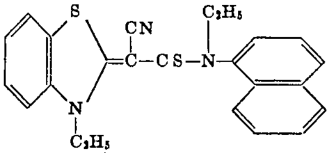
F.P. 154–156°.
7.
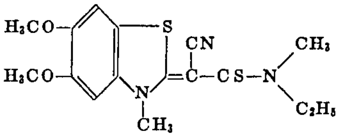
F.P. 184–185°.
8.
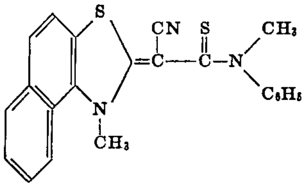
F.P. 241–242°.
9.
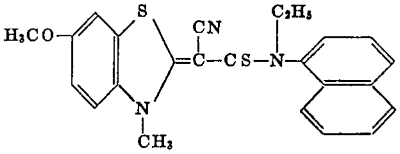
F.P. 170–171°.
10.
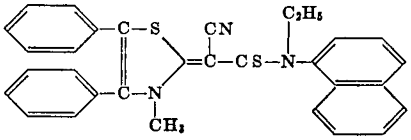
F.P. 232–235°.
11.
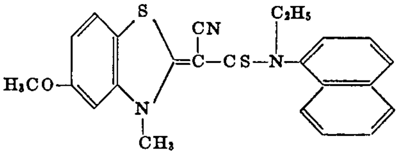
F.P. 230–231°.

12.
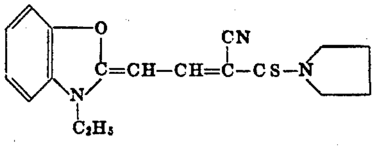
F.P. 188-190°.
13.
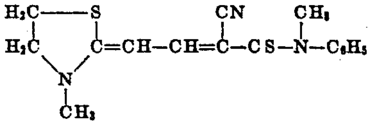
F.P. 118-120°.
14.
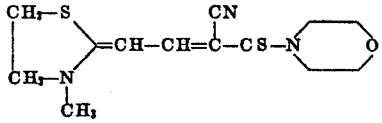
F.P. 157-159°.
15.
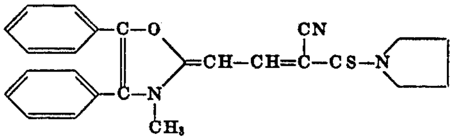
F.P. 161-164°.
16.
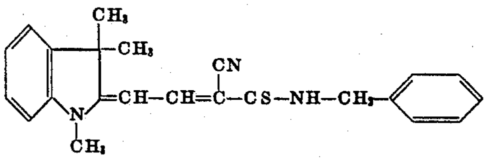
F.P. 233-235°.
17.
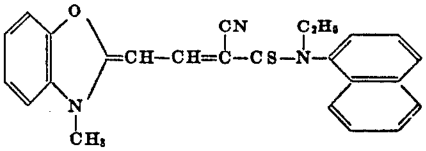
F.P. 140-142°.
18.
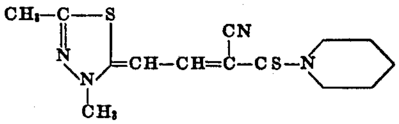
F.P. 169-170°.
19.
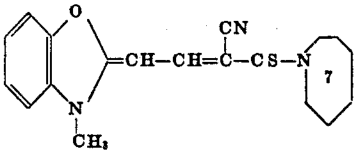
F.P. 155-157°.
20.
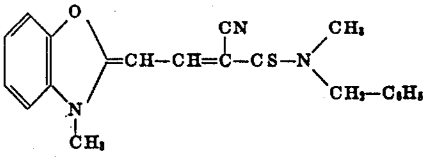
F.P. 201-203°.
21.
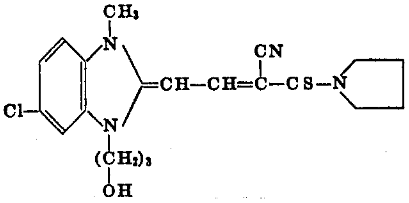
F.P. 224-226°.
22.
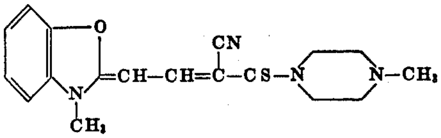
F.P. 193-195°.
23.
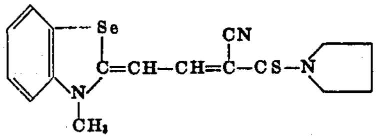
F.P. 226-228°.

| | | |
|---|---|---|
| 24 | 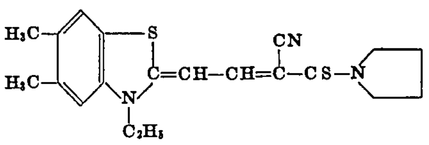 | F.P. 285-287°. |
| 25 | 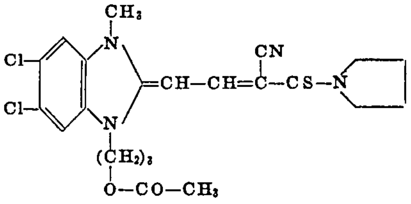 | F.P. 236°. |
| 26 | 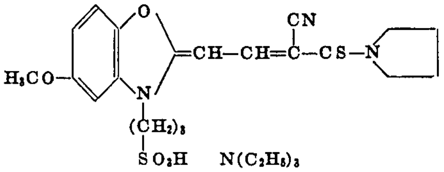 | F.P. 188-190°. |
| 27 | 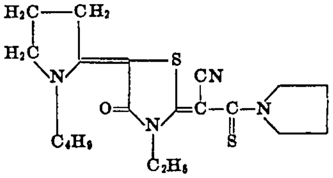 | F.P. 168-170°. |
| 28 | 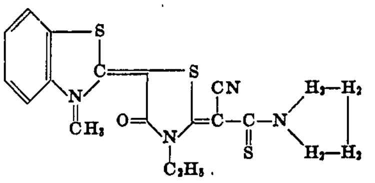 | F.P. >290°. |
| 29 | 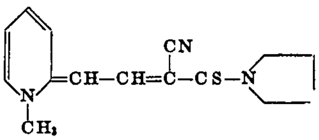 | F.P. 195-198°. |
| 30 | 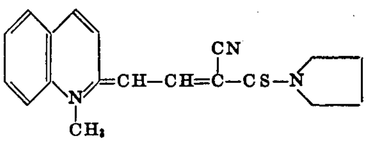 | F.P. 215-216°. |
| 31 | 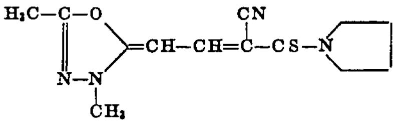 | F.P. 204-206°. |
| 32 | 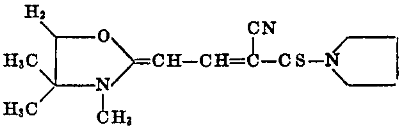 | F.P. 156-158°. |

The sensitizers used according to this invention can be produced by the usual processes, for example by condensation of a methyl mercapto quaternary salt or of an acetanilidovinyl quaternary salt of a heterocyclic base with a cyanothioacetamide compound in pyridine or in alcohol with the addition of a base, such as triethylamine.

Specifically referring to the preparation of a representative sensitizer, the preparation of sensitizer compound 12 is as follows:

Cyanothioacetamides can be easily obtained by sulfurizing the corresponding cyanoacetamides with phosphorus pentasulfide either without solvents or with the addition of an inert solvent such as toluene or xylene; unsubstituted cyanothioacetamide can be prepared by the addition of hydrogen sulfide to malonitrile, as given in Chem. Ber. 93, 1559 (1960).

The preparation of compound 12 is described in detail below:

4.8 g. of N-ethyl-2-β-acetanilido-vinyl-benzoxazoliumtosylate are heated under reflux in an oil bath for 5 minutes together with 1.4 g. of cyanothioacetic acid pyrrolidide in 30 ml. of acetic acid anhydride and 2ml. of triethylamine. The dye precipitates on cooling. Recrystallized from methanol: m.p. 188°–190° C., yield 2.8 g. Absorption maximum 455 mμ (in methanol).

Cyanothioacetic acid pyrrolidide can be prepared as follows:

69 g. of cyanoacetic acid pyrrolidide are heated together with 50 g. of phosphorus pentasulfide in 600 ml. of xylene on an oil bath at 110°to 120° C. (reaction temperature) with stirring for 1 hour and then stirred for 30 minutes at this temperature. The reaction mixture is filtered while hot to remove the residue, and the product precipitates on cooling and is removed by suction filtration and washed with petroleum ether. When recrystallized from ethyl acetate, the substance melts at 106° to 108° C. Yield 46.8 g.

Referring next to the light-sensitive polymers, the sensitizers according to the invention can be used quite generally for increasing the light-sensitivity of polymers which can be cross-linked by light. In the case of certain light-sensitive polymers, the spectral sensitivity can also be shifted into the visible region of the spectrum by this method. These sensitizers are preferably used in combination with light-sensitive polymers of the type in which the groups which can be cross-linked by light are cinnamic acid, cinnamylidine acetic acid or o-quinone diazides. Polymers of this type and the light-sensitive layers produced from them have been described, (e.g., in French Pat. specification No. 1,004,922, German Pat. specification No. 1,063,802 and U.S. Pat. specification No. 3,257,664.

Polymers which contain o-quinone diazide groups have been described, (e.g., in Dutch Pat. specification No. 6,702,042.

The sensitizers are incorporated with the light sensitive resins by suitable methods, as for example by dissolving the light-sensitive synthetic resins in suitable solvents with the addition of sensitizers to this solution. The concentration of the sensitizer is about 0.5 to 10 and preferably 1 to 7 percent by weight, based on the weight of the light-sensitive synthetic resin. The concentration is not critical and depends on the requirements of the particular reproduction process and the inherent sensitivity of the resin which is used. The best concentration can be determined in known manner by a few simple tests. The concentration of sensitizer also depends to some extent on the thickness of the layer, lower concentrations generally being used in thicker layers to obtain complete hardening of the layer.

The light-sensitive layers which have been sensitized in accordance with the invention can be worked up in the usual manner. The sources of light used are preferably high energy carbon arc lamps or mercury vapor lamps. The layer is developed in known manner after exposure by dissolving out the parts of the layer which have not been exposed.

The relief images thereby obtained can be used for all known purposes.

The following specific examples illustrate the incorporation of a sensitizer with a light sensitive polymer and the increased sensitization upon exposure and processing of the recording material, but these examples are not limitative:

EXAMPLE 1

Four g. of a reaction product of 1 part by weight of a copolymer of ethylene/vinyl alcohol (1:1) and 2 parts by weight of m-isocyanatocinnamic acid ethyl ester (see German Pat. specification No. 1,063,802) and 0.04 g. of sensitizer No. 8 are dissolved in 46 g. of butyl acetate. An aluminum foil is coated with this solution on a centrifugal coating machine (100 r.p.m. and dried.

The layer is exposed behind a grey wedge to a carbon arc lamp (30A., 42 v.) at a distance of 70 cm. for 5 minutes and developed for 2 minutes in butyl acetate which contains 0.1 percent of Irisolechtblau BLE (CI p. 591). The layer is washed with water and dried in air. Ten Steps of the grey wedge are visible on the support.

If the layer on the support is exposed under the same conditions without the addition of sensitizer, only 3 steps of the grey wedge are visible. Density of step 3: 0.33, step 10: 1.40. From this it follows that the sensitivity has been increased 11.7 times by the addition of sensitizer.

When other sensitizers according to the invention are used instead of sensitizer 8, the increases in sensitivity listed in the following table are obtained. The compound methyl-2-(N-methylbenzothiazolylidene)-dithioacetate (I) described in German Pat. specification No. 1,182,061, column 6, lines 42 to 51 and the compound 2-cinnamoylmethylene-3-ethyl-benzothiazole (II) described in U.S. Pat. specification No. 2,732,301, column 4, lines 15 to 25, are included for comparison.

| Sensitizer No. | Quantity in g. Per Polymer | Steps of Grey Wedge | Relative Sensitivity |
|---|---|---|---|
| None | — | 3 | 1 |
| 1 | 0.01 | 9 | 8 |
| 2 | 0.02 | 11 | 17 |
| 3 | 0.02 | 11 | 17 |
| 4 | 0.02 | 11 | 17 |
| 5 | 0.01 | 9 | 8 |
| 6 | 0.02 | 11 | 17 |
| 7 | 0.01 | 9 | 8 |
| 8 | 0.01 | 10 | 11.7 |
| 9 | 0.01 | 10 | 11.7 |
| 10 | 0.01 | 10 | 11.7 |
| 11 | 0.01 | 9 | 8 |
| 12 | 0.01 | 9–10 | 10 |
| 13 | 0.01 | 3–4 | 1.1 |
| 17 | 0.01 | 5 | 3.9 |
| 27 | 0.01 | 5 | 3.9 |
| 28 | 0.01 | 9 | 8 |
| I | 0.01 | 2 | 0.7 |
| II | 0.01 | 8 | 5.5 |

The sensitivity of the sensitized layers compared with the non-sensitized layer was calculated from the number of dyed steps of the layer remaining on the support according to the following equation:

$$S_x = \text{antilog } D_x \text{antilog } D_o$$

where $D_x$ is the density of the grey wedge of the last sensitized layer still adhering to the support and $D_0$ is the density of the grey wedge of the last non-sensitized layer still on the support.

EXAMPLE 2

A 2% solution by weight of a copolymer of 12 mols % of vinyl acetate, 50 mols % of vinyl cinnamylidene acetate and 38 mols % of vinyl benzoate in chlorobenzene is prepared (see U.S. Pat. specification No. 3,257,664, Example 8) and applied on an aluminum foil by means of a centrifugal coating machine as described in Example 1 and dried.

The layer is then exposed as in Example 1. After development in chlorobenzene (2minutes), 7 steps of the grey wedge are visible. Density of stage 7: 0.92. When compared with the polymer from Example 1, the sensitivity is found to be increased by the factor 3.9.

In another experiment, 10 % by weight of sensitizer 24, based on the weight of the polymer, are added. After exposure and development, 16 steps of the grey wedge are visible. Density of stage 16: 2.32. This indicates a 96 fold increase in sensitivity compared with the polymer of Example 1.

If other sensitizers according to the invention are used instead of sensitizers 24, the following relative increases in sensitivity are obtained under otherwise identical conditions:

| Sensitizer No. | Step Number of Grey Wedge | Relative Sensitivity |
|---|---|---|
| None | 7 | 3.9 |
| 15 | 16–17 | 115 |
| 16 | 15 | 69 |
| 18 | 15–16 | 83.5 |
| 19 | 16–17 | 115 |
| 20 | 16–17 | 115 |
| 22 | 16–17 | 115 |
| 23 | 17–18 | 160 |
| 24 | 16 | 96 |
| 27 | 15–16 | 83.5 |
| 28 | 16 | 96 |

The relative sensitivity is calculated as in Example 1. For comparison with the sensitizers used according to the invention, 4-(p-n-amyloxyphenyl)-2,6-bis-(p-ethylphenyl)-thiapyryllium perchlorate (III) used in U.S. Pat. specification No. 3,257,664 yields 14 to 15 wedge steps under the same conditions, which corresponds to a relative sensitivity of 57.5.

EXAMPLE 3

An aluminum foil is coated on a centrifugal coating machine (100 r.p.m.) with the polymer of Example 2 without the addition of a sensitizer, and dried.

The layer is exposed to a carbon arc lamp (30 A., 42 v.) at a distance of 70 cm. for 20 minutes behind a grey wedge on which filters which are only permeable to certain wavelengths (band filters) are placed at short intervals, and the layer is developed in chlorobenzene for 2 minutes. 16 Steps of the grey wedge are visible. When 10 percent by weight of the sensitizers according to the invention, based on the weight of polymer, are added, the following figures are obtained in the same test:

| Sensitiser No. | Grey wedge steps | Band filter wedge steps | | | | | | |
|---|---|---|---|---|---|---|---|---|
| | | 390 | 405 | 445 | 480 | 505 | 530 | 550 mμ |
| None | 16 | | | | | | | |
| 12 | 30 | 19 | 19 | 17 | 17 | 12 | 12 | |
| 15 | 27 | 12 | 13 | 15 | 11 | | | |
| 16 | 26 | 8 | 8 | 9 | 10 | 4 | | |
| 18 | 28 | 8 | 10 | 8 | 12 | 10 | 5 | |
| 20 | 29 | 13 | 13 | 11 | 11 | 6 | | |
| 22 | 29 | 10 | 12 | 10 | 10 | 5 | 1 | |
| 23 | 29 | 8 | 9 | 7 | 11 | 10 | 9 | |
| 25 | 27 | 6 | 8 | 9 | 12 | 11 | 9 | |
| Comparison* | 26 | 8 | 9 | 8 | 7 | 4 | | |

*The compound used for comparison was 4-(p-n-amyloxyphenyl)-2,6-bis-(p-ethylphenyl)-thiapyryllium perchlorate; see U.S. patent specification 3,257,664, which was mentioned in Example 2.

EXAMPLE 4

The same procedure is used as described in Example 3, but a polymer which had been prepared by reacting a polycondensate of 2,2-bisphenylol propane and epichlorohydrin with o-naphthoquinone diazide sulfochloride (see Dutch Pat. application No. 6,702,042) was used instead of the light-sensitive polymer used in Example 2. A 1 percent solution of such a polymer containing naphthoquinone diazide groups in a mixture of methylene chloride/tetrachloroethane (2:1) is applied to an aluminum foil with a centrifugal coating machine as mentioned in Example 3 and dried.

The layer is then exposed behind a band filter and developed in a mixture of methylene chloride and tetrachlorethane (2:1). The following step values are obtained for the different samples. The amount of sensitizer added in each case is 10 percent by weight.

| Sensitiser No. | Band filter wedge steps | | | | | | | | | | |
|---|---|---|---|---|---|---|---|---|---|---|---|
| | 390 | 405 | 420 | 435 | 445 | 455 | 480 | 505 | 515 | 530 | 545 |
| None | 8 | 8 | 8 | 7-8 | 3-4 | 2-1 | | | | | |
| 20 | 7-8 | 7-8 | 8 | 7-8 | 4-5 | 7 | 4 | | | | |
| 23 | 8 | 8 | 8-9 | 8 | 6 | 7 | 6-7 | 4-5 | 4-5 | 4-5 | 1 |
| Comparison* | 8 | 8 | 8 | 7 | 5 | 5-6 | 3-4 | | | | |

*See footnote to Example 4.

We claim:

1. A photographic recording material comprising at least one layer of light-sensitive polymer containing radicals selected from the group consisting of azide radicals and radicals derived from cinnamic acid and cinnamylidene acetic acid, which material contains a compound of the following formula:

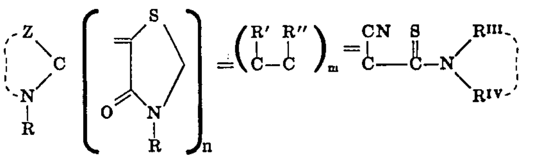

in which

Z represents the nonmetallic ring members required to complete a heterocyclic ring which may contain a fused benzene or naphthalene ring of the group consisting of thiazole, thiazolin, oxazole, oxazolin, indoline, thiadizole, imidazole, selenazole and pyrolline.

R is a saturated or olefinically unsaturated aliphatic radical, a cycloalkyl, phenyl or phenylalkyl group;

$R'R''$ is a hydrogen atom or alkyl having up to three C-atoms;

$R'''$, $R^{IV}$ is hydrogen, a saturated or olenfinically unsaturated aliphatic group, cycloaklyl, phenylalkyl or a radical of the phenyl or naphthyl series or a heterocyclic groups;

$R'''$ and $R^{IV}$ together may represent the ring members required to complete a pyrrolidin, piperidin, hexamethylenimin piperazin, morpholin, thiomorpholin or isoindolenin ring.

$n$ is 0 or 1, and $m$ is 0 or 1.

* * * * *